United States Patent [19]

Ickinger et al.

[11] Patent Number: 5,217,722

[45] Date of Patent: Jun. 8, 1993

[54] APPARATUS FOR PRODUCING A CONVEYOR BELT

[75] Inventors: Georg Ickinger; Johann Rosler; Rupert Syrowatka; Walter Bachlinger, all of Graz; Peter Scheucher, Kumberg, all of Austria

[73] Assignee: Maschinenfabrik Andritz Actiengesellschaft, Graz, Austria

[21] Appl. No.: 924,939

[22] Filed: Aug. 5, 1992

Related U.S. Application Data

[62] Division of Ser. No. 609,529, Nov. 6, 1990, Pat. No. 5,169,581.

[30] Foreign Application Priority Data

Nov. 6, 1989 [AT] Austria .................. 2546/89

[51] Int. Cl.⁵ ............................... B29C 45/14
[52] U.S. Cl. ........................... 425/111; 425/126.1; 425/127; 425/129.1; 425/190; 425/290; 425/301; 425/812; 425/144; 425/145; 425/150
[58] Field of Search .............. 425/111, 117, 126.1, 425/127, 129.1, 144, 145, 150, 290, 301, 302.1, 190, 812; 264/138, 154, 156, 252, 257, 274

[56] References Cited

U.S. PATENT DOCUMENTS

| | | | |
|---|---|---|---|
| 2,013,242 | 9/1935 | Johns | 198/819 |
| 2,836,285 | 5/1958 | Müller | 198/821 |
| 2,839,181 | 6/1958 | Renner | 198/819 |
| 2,845,166 | 7/1958 | Schaeffer | 198/819 |
| 2,873,501 | 2/1959 | Renner | 198/819 |
| 3,328,220 | 6/1967 | Harding | 264/252 |
| 3,408,438 | 10/1968 | Staunton | 264/252 |
| 3,428,164 | 2/1969 | Lovegreen | 198/821 |
| 3,491,176 | 1/1970 | Wahlstrom | 264/252 |
| 3,529,714 | 9/1970 | Mayhew et al. | 198/819 |
| 3,596,597 | 8/1971 | Fountain | 264/252 |
| 3,608,139 | 9/1971 | Wahlstrom | 425/126.1 |
| 3,713,923 | 1/1973 | Laguerre | 264/252 |
| 3,941,238 | 3/1976 | Lapeyre | 198/842 |
| 4,090,835 | 5/1978 | Bronson, Jr. et al. | 264/252 |
| 4,410,082 | 10/1983 | McGinnis | 198/819 |
| 4,532,098 | 7/1985 | Campbell et al. | 264/252 |
| 5,147,658 | 9/1992 | Furukawa et al. | 425/129.1 |

FOREIGN PATENT DOCUMENTS

| | | | |
|---|---|---|---|
| 714464 | 7/1965 | Canada | 264/252 |
| 1012865 | 7/1957 | Fed. Rep. of Germany . | |
| 1076030 | 2/1960 | Fed. Rep. of Germany . | |
| WO87/3565 | 6/1987 | PCT Int'l Appl. . | |

Primary Examiner—Jay H. Woo
Assistant Examiner—Robert B. Davis
Attorney, Agent, or Firm—Roylance, Abrams, Berdo & Goodman

[57] ABSTRACT

A conveyor belt has edges with longitudinally extending profiles formed as grooves or elevations for sealing and guiding. An apparatus for producing belts with profiled edges uses a cutting device and profiled molds to form profiles in the belt and its edge while the belt is guided and supported by rolls. The apparatus further includes a cutter which forms a groove in the conveyor belt and which allows lateral guiding of the bolt in relation to the mold.

30 Claims, 7 Drawing Sheets

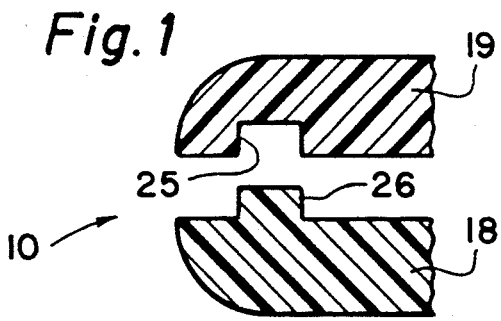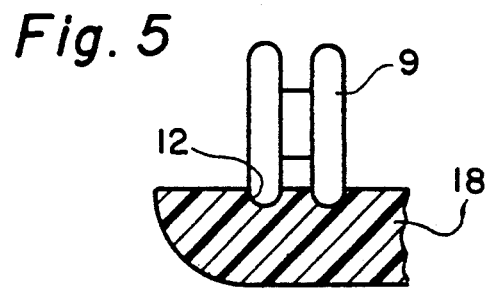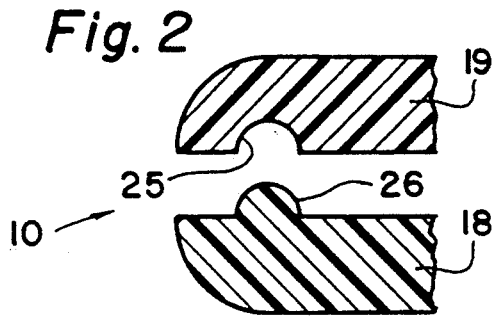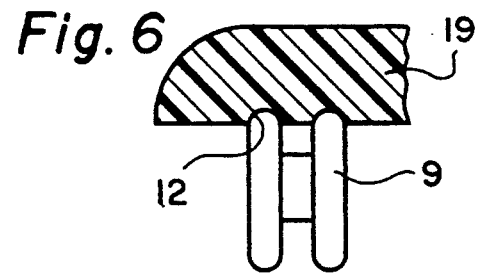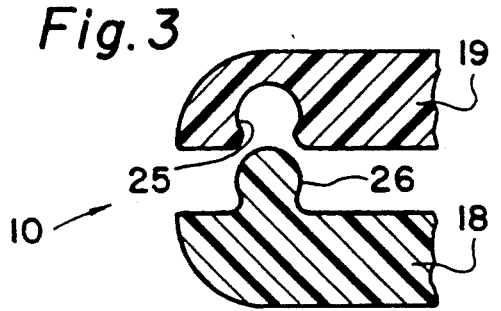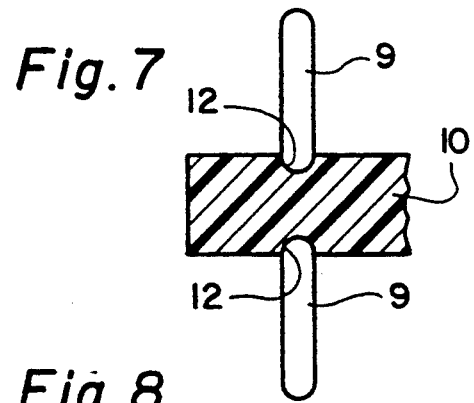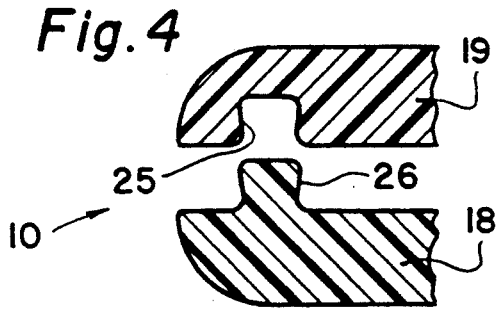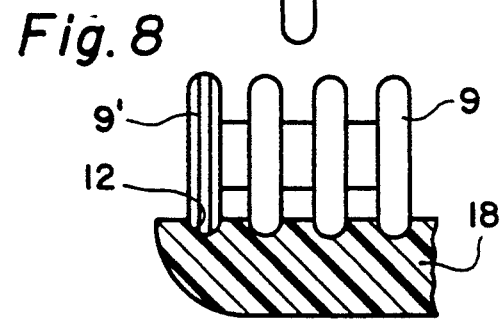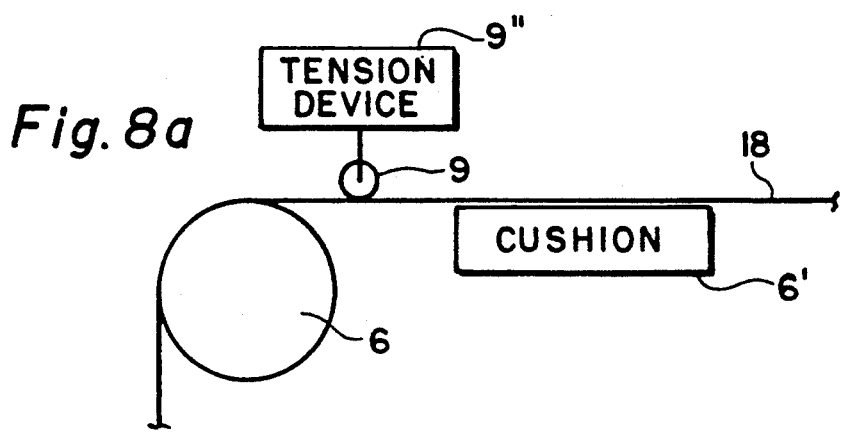

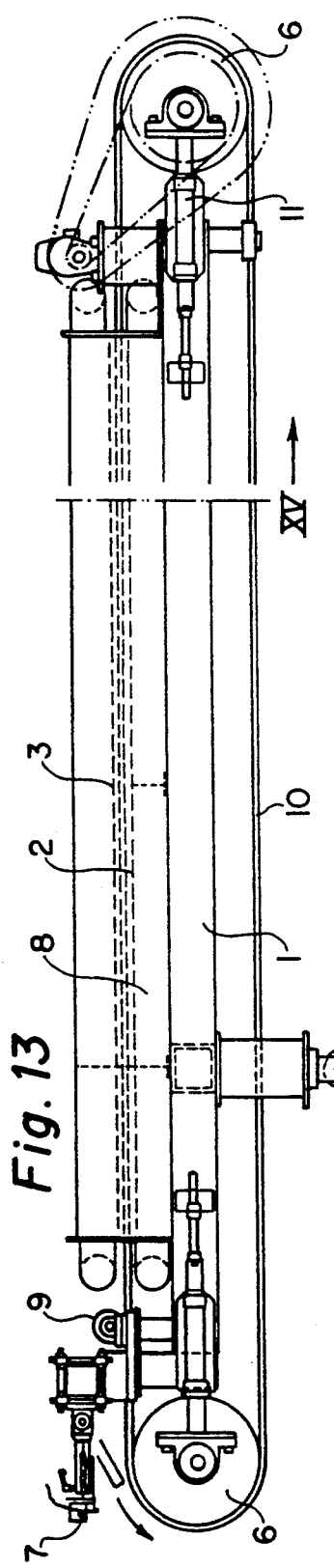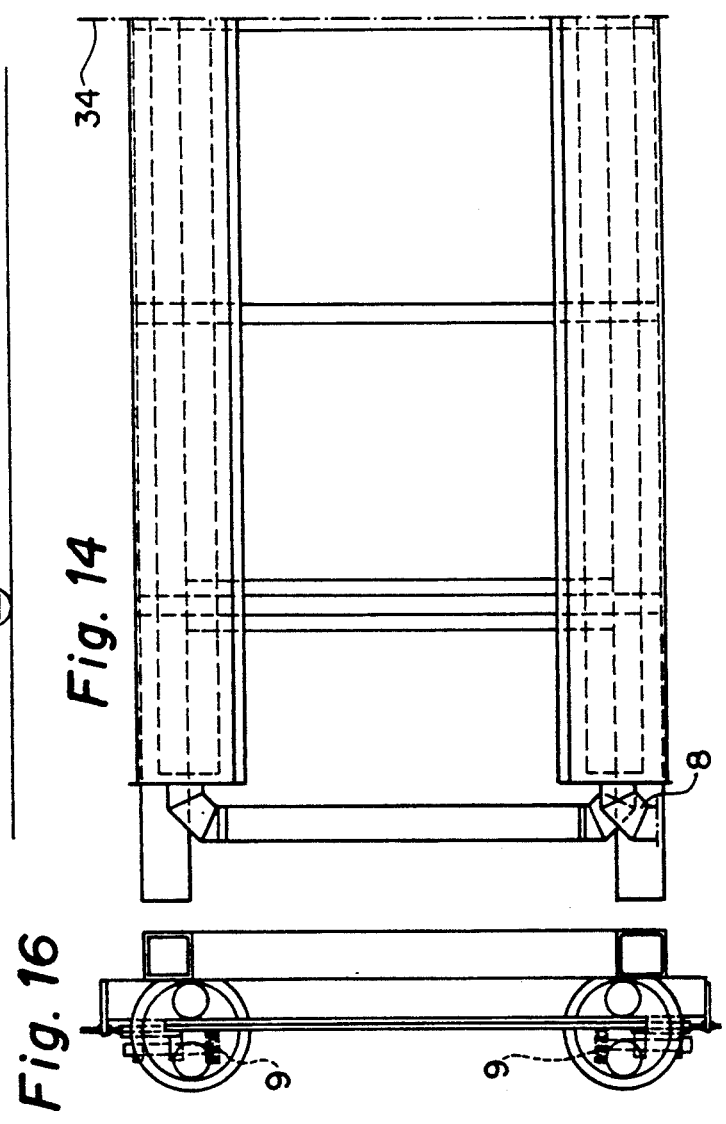

APPARATUS FOR PRODUCING A CONVEYOR BELT

This is a division of application Ser. No. 07/609,529 filed Nov. 6, 1990, now U.S. Pat. No. 5,169,581.

BACKGROUND OF THE INVENTION

1. Field of the Invention

The present invention relates to a conveyor belt having profiled edges and the process and apparatus for the production of the belt. More particularly, this invention relates to a belt having molded or coated edges with grooves and/or elevations formed therein and the apparatus and process for forming the edges and profiles.

2. Description of the Prior Art

Standard conveyor belts made of elastomers with fabric inserts are generally unsuitable in operation as precision belts for exact guidance and precise sealing because geometric changes occur in the belts due to residual stress, imprecision in the production of joints and changes in the ratio of longitudinal to transverse extension.

Belt regulators and belt guiding means are known which apply lateral guiding forces to the belt by transverse positioning of regulating rolls, but such means tend to cause a constant pendulum movement of the belt. There are also belt regulators which attempt to emulate a belt course by shifting the axes of the supporting rolls and thus the alter lateral course of the belt.

In these types of regulators, a regulating range is required such that time elapses between the deviation of the belt and the control movement, and thus, a tolerance width beyond the required extend of precision is necessary.

SUMMARY OF THE INVENTION

According to the invention, the belt has longitudinally extending edges formed on its sides, the edges having profiles which are formed as grooves, depressions, tongues or elevations to precisely guide and seal the belt. The belt assembly may consist of at least one upper belt and at least one lower belt. In this case, the profile on the edge of the underside of the upper belt is formed as a depression and the profile on the upper side of the lower belt is formed as an elevation of corresponding shape such that the space between these two belts, through which the goods are conveyed, is sealed against the environment upon superimposing the upper and lower belts and interlocking the respective depression and elevation. Profile grooves may also be provided across the entire width of the belt to aid in dewatering processes for example. Additionally, the profile may be provided in the longitudinal sides of the belt, one longitudinal side being provided with at least one groove or depression and the other longitudinal side being provided with at least one correspondingly formed tongue or elevation. The groove and tongue connection may be formed as a snap-on closure to close the belt in a tubular configuration.

The conveyor belt according to the invention utilizes a belt material suitable for transporting goods in a covered position with the upper and lower belts enclosed and sealed against one another. The belts may be arranged for continuous charging and passing of treatment zones, for example cooling zones, heating zones, irradiation zones and pressure zones. The assembly may be used with superpressure and negative pressure zones, for example in dewatering machines having a transport lock in the inlet and outlet system of a pressure disk filter.

The invention also relates to a lateral guide for a conveyor belt according to the present invention having at least one profile part or at least one profile engaging guide roll, called a profile roll, fixedly attached to or rotatably supported by the basic frame supporting the conveyor belt, wherein the profile roll engages a longitudinally extending profile in the belt. This engagement assures a precise lateral guidance of the belt and in particular the precise ascent of the belt onto the rotating roll. A force or tension measuring means is provided on the profile roll to permit a threshold value determination of tension upon subsequent stopping or adjustment of the rotating support rolls. The feeding of the conveyor belt to the profile roll is effected on an air cushion or water bed, so that lateral forces, e.g. transversal forces from the roll guides, can be avoided. This further improves the precise ascent of the belt onto the rotating support roll.

By means of the precision belts according to the invention provided with longitudinal profiles laterally guided by profile rolls, it is possible to obtain a positive ascent onto the support roll, so that no control activity is required and the tolerance width in the range of the required precision of ±0.2 mm is achieved.

The invention further relates to a process for the production of a conveyor belt according to the present invention characterized by a basic belt free of stress, preferably with a supporting fabric insert, coated with plastic material on its sides by means of countermold. Alternatively, the belt may be provided with plastic material edges in one or several castings by injection molding in parallel molds attached to a holding device. The basic belt is formed free of stresses by continuously running the belt at low tension and high temperatures. The plastic materials used for the edges are preferably polyurethane elastomers. According to another embodiment of the process, profiled molds may be used for producing the profiled edges.

Alternatively in an endless belt, an orientation groove can first be placed in the belt with precise adjustment of the belt course, to serve for positive lateral belt course control and guidance from a profile roll. The profile is then cut into the plastic material coating or the plastic material edges with a cutting device. In order to impart higher strength to the joint in an endless conveyor belt or to the joint between individual runs or plastic material edge portions, fabric inserts are used to connect the plastic material coating or the plastic material edges at the beginning and end of the conveyor belt or the beginning and end of individual runs. The fabric insert may be perforated in order to provide a positive connection with the plastic material coating or the plastic material edges.

The present invention also embodies an apparatus for carrying out the above process characterized by two rotatable rolls, whose mutual distance is adjustable by means of a tensioning device, provided for supporting the conveyor belt. An upper mold and a lower mold for receiving the conveyor belt at its sides are also provided. These molds are optionally heatable. The upper mold is tiltably supported in relation to the lower mold onto the surface of the conveyor belt to seal the mold against the belt. The mold has a plastic material feed and one guide roll for the lateral guidance of the conveyor belt. A multiple cutting means is provided for the production of the initial profile or additional profiles in the belt. The multiple cutting means may be a multiple contour knife heated by means of an electric resistance heater, the power of the electric resistance heater being controlled as a function of the spring force or spring path acting in an axial direction due to the cutting force. If the knife is not heated enough, the cutting resistance increases and the deviation of the belt path control is greater. Controlling the heating power reduces the deviation of the belt path which results in a precise multiple profile.

BRIEF DESCRIPTION OF THE DRAWINGS

FIG. 1 shows the edges of mating conveyor belts with tongue and groove profiles according to the invention in cross-section;

FIG. 2 shows a modification of the profiles shown in FIG. 1 on the edge of mating conveyor belts in cross-section;

FIG. 3 shows a snap-fit tongue and groove profile on the edge of mating conveyor belts in cross-section;

FIG. 4 shows a modification of the snap-fit shown in FIG. 3 on the edge of mating conveyor belts in cross-section;

FIGS. 5 to 8 show the edge of various sides of conveyor belts with grooved profiles in cross-section engaged with profile guide rolls;

FIG. 8a shows a schematic diagram of a belt guided by a profile roll onto a support roll;

FIG. 13 is an elevational view of an apparatus according to the invention for producing the profiled edges of a conveyor belt according to the invention;

FIG. 14 shows a plan view of a portion of the apparatus shown in FIG. 13;

FIG. 15 represents a partial view of this apparatus in the direction of arrow XV in FIG. 13;

FIG. 16 is a side elevational view of FIG. 14;

DESCRIPTION OF THE PREFERRED EMBODIMENT

Figure 9:
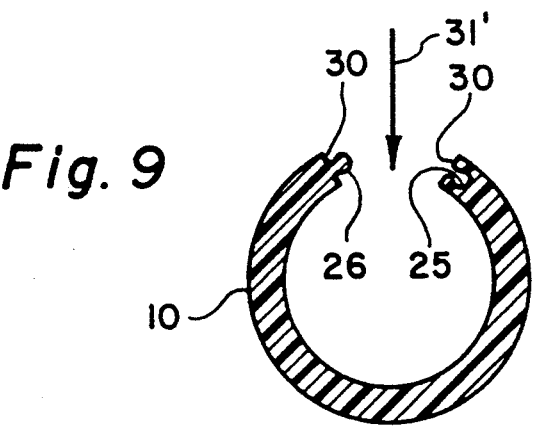
FIG. 9 shows the cross-section of a belt having interlocking profiled edges with the conveyor belt arranged in an open charging position.

Although specific terms are used in the following description for the sake of clarity, these terms are intended to refer only to the particular structure of the invention selected for illustration in the drawings and are not intended to define or limit the scope of the invention.

The term "profile" used herein is intended to denote a depression or elevation formed in the surface of the belt or belt edge as seen in cross-section. Thus, a "profiled edge" means the edge of the belt having a longitudinally extending depression or elevation.

Referring now to the drawings, FIGS. 1 through 4 show the profiled edges of a precision elastomeric conveyor belt 10 according to the invention as lower belt 18 and upper belt 19. The edges of belts 18 and 19 are preferably formed of plastic, such as polyurethane elastomers, and are longitudinally profiled in complementary shapes for interlocking the belts together in a facing relationship.

The goods to be transported by the belts, for instance filter cake, are sealed from the environment by the profiled edge closure. The profile, as shown in FIGS. 1-4, may be formed as an elevation or tongue 26 in lower belt 18 and a depression or groove 25 in upper belt 19. FIGS. 3 and 4 particularly show a tongue-and-groove connection providing a snap-on closure with tongue 26 being bulbous and groove 25 being constricted. Of course, lower belt 18 may contain the groove and upper belt 19 may contain the tongue if desired.

Using sealingly closed or material-enclosing conveyor belts and passing of such conveyor belts into pressure chamber areas with sealing requires precision in belt production of at least ±0.2 mm. Moreover, the surface of profile or tongue 26, on the one hand, and that of guiding grooves and sealing grooves 25, on the other hand, must be of high quality in order to assure low friction losses and proper sealing.

FIGS. 5 to 8 show profiled precision belt edges according to the present invention with profiles in the form of depressions or grooves 12 providing precise lateral guidance by means of profile engaging guide rolls 9, called profile rolls.

Figure 12:
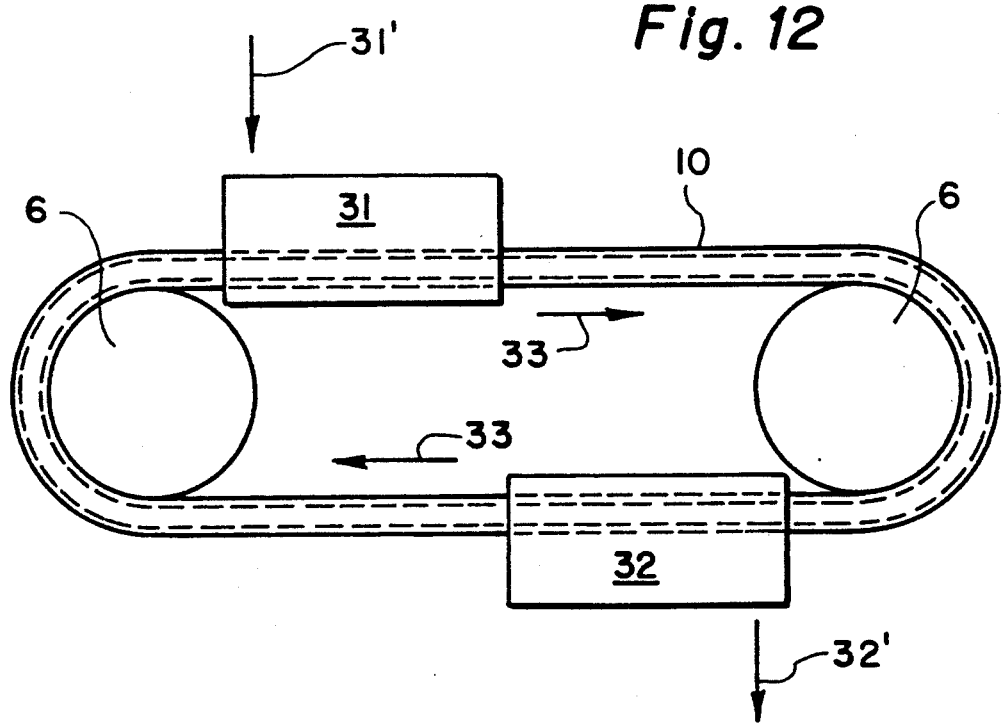
FIG. 12 shows a side elevation of the conveyor belt of FIGS. 9-11 used in an assembly.

FIG. 5 shows the engagement of guide roll 9 with double profile grooves 12 in lower belt 18. FIG. 6 is an analogous representation for upper belt 19. The configuration shown in FIGS. 5 and 6 is the type of guide and belt suitable for use in a dewatering machine. Profile roll 9 is positively engaged in longitudinal profile grooves 12 provided in the longitudinal direction of conveyor belt 10 and brings belts 18 and 19 ascending onto a reverting roll or breast roll 6 into the proper ascending position in an assembly such as shown in FIGS. 12 or 13. FIG. 7 shows the lateral guidance of a conveyor belt 10 provided with a longitudinal profile on its upper side as well as on its lower side by means of two profile rolls 9.

If the guiding forces of the ascension of the precision belt are very high, the belt may run untrue with single grooves due to high transversal force. In that case, lateral guidance is applied as shown in FIG. 8, in which lower belt 18 is guided by means of profile roll 9 formed as a multiple-profile roll.

Profile roll 9 may also be provided with a sensor 9' on the front face of roll 9, shown in FIG. 8, connected to a known electronic device 9" which measures the axial deviating force or tension. Also, to avoid lateral forces when feeding a belt onto a support roll 6, a cushion 6' filled with air or water may be provided to ensure precise ascent. Device 9" and cushion 6' are shown schematically in FIG. 8a.

Figure 10:
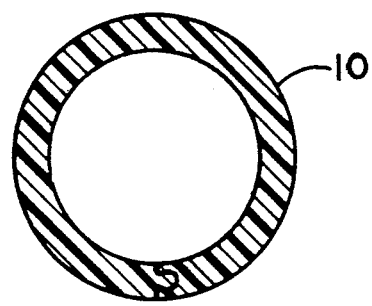
FIG. 10 shows the conveyor belt of FIG. 9 in a closed transporting position.
Figure 11:
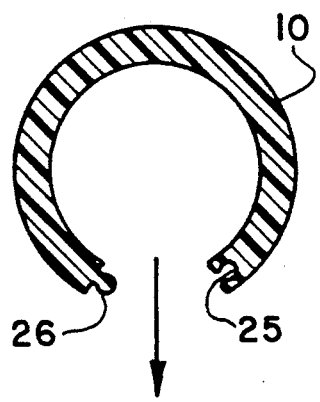
FIG. 11 shows the conveyor belt of FIG. 9 in an open discharging position.

Instead of using two belts (lower belt 18 and upper belt 19), the transported goods can also be tightly enclosed in one single belt whose marginal areas are sealingly connected by a groove and tongue profiled edge closure. Conveyor belt 10 shown in cross section in FIGS. 9 to 11 is provided with snap-on profiles 25 and 26 on longitudinal sides 30. During operation of an assembly as shown in FIG. 12, belt 10 is arranged in a tubelike configuration to pass over rolls 6 in the direction of arrow 33. Upon entering charging station 31, belt 10 is opened as shown in FIG. 9, and transport goods are dispensed into the cavity of belt 10 in the direction of arrow 31'. Closed belt 10, as shown in FIG. 10, is then conveyed through the assembly around roll 6 to discharge or evacuation station 32 where belt 10 is opened, as shown in FIG. 11, to discharge or evacuate the transport goods in the direction of arrow 32'. The transport goods are completely protected against external influences inside of tubelike conveyor belt 10 during the entire transport path from charging station 31 to discharge station 32.

FIGS. 13 to 16 show an apparatus for carrying out the process for the production of precision conveyor belts with longitudinally extending profiled edges according to the invention.

The production of precision conveyor belts of elastomers is accomplished by casting or injection technology. By limiting the shot weight, i.e. the amount of elastomer processed by the casting or injection machine at one time, the dimension and/or length of the belts is limited. Thus an economical production of larger belts is only possible by extrusion processes or in discontinuous manufacture by coating or attachment by means of adhesive. Although it is possible to produce webs or belts of any given length by extrusion processes, these belts have to be jointed for producing an endless web or belt, which results in the same problems with precision and strength as occur with discontinuous production processes.

The apparatus represented in FIGS. 13 to 16 serves mainly for the discontinuous production of profiled precision belts and/or for coating or casting of edges or profiles on conveyor belts. Basic frame 1 is inclined by about 30 degrees in relation to the belt direction during the casting operation in order to prevent the forming of bubbles in the cast material by directed flow. Prior to and during coating, precision belt 10 is supported by two rolls 6 and brought to the desired tension by tensioning means 11, which may be a hydraulic or pneumatic cylinder or conventional screw type cylinder. Sides or marginal area of belt 10 extend between a lower mold 2 and an upper mold 3 heated by means of a hot air heater 8 to about 60°-70° C. Profiling means 7 produces longitudinally extending profiles in the surface of belt 14 both before molding edge 15 to provide orientation profile groove 12' and before or after molding to provide additional profile grooves 12 if desired. Profile groove 12" is optionally provided in edge 15 to guide belt 10 in a longitudinal direction by profile roll 9 to profiling means 7. Profiling means 7 is a multiple contour knife heated by an electric resistance heater. Belt 10 is driven by controlled motor 4 which drives roll 6 via gear 5. The axis of symmetry of the device is designated 34 in FIG. 14.

Figure 17:
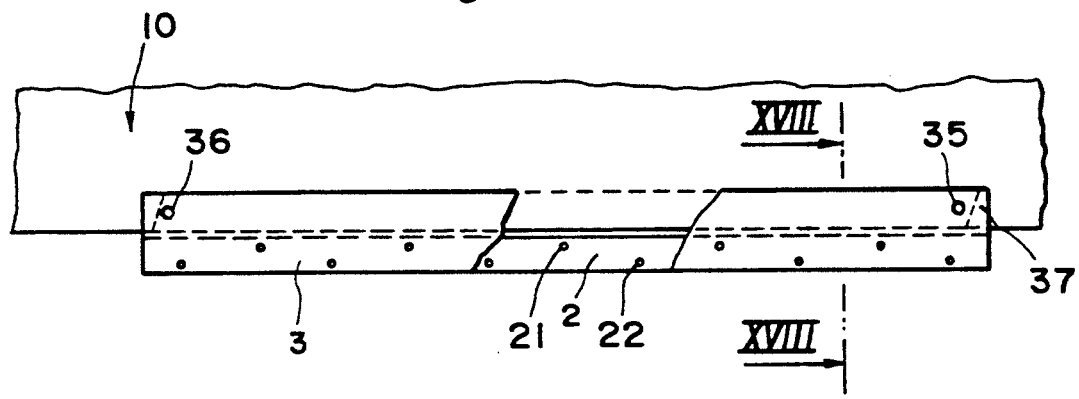
FIG. 17 is a partial plan view of the mold for the edge of the conveyor belt in the apparatus according to the invention.
Figure 18:
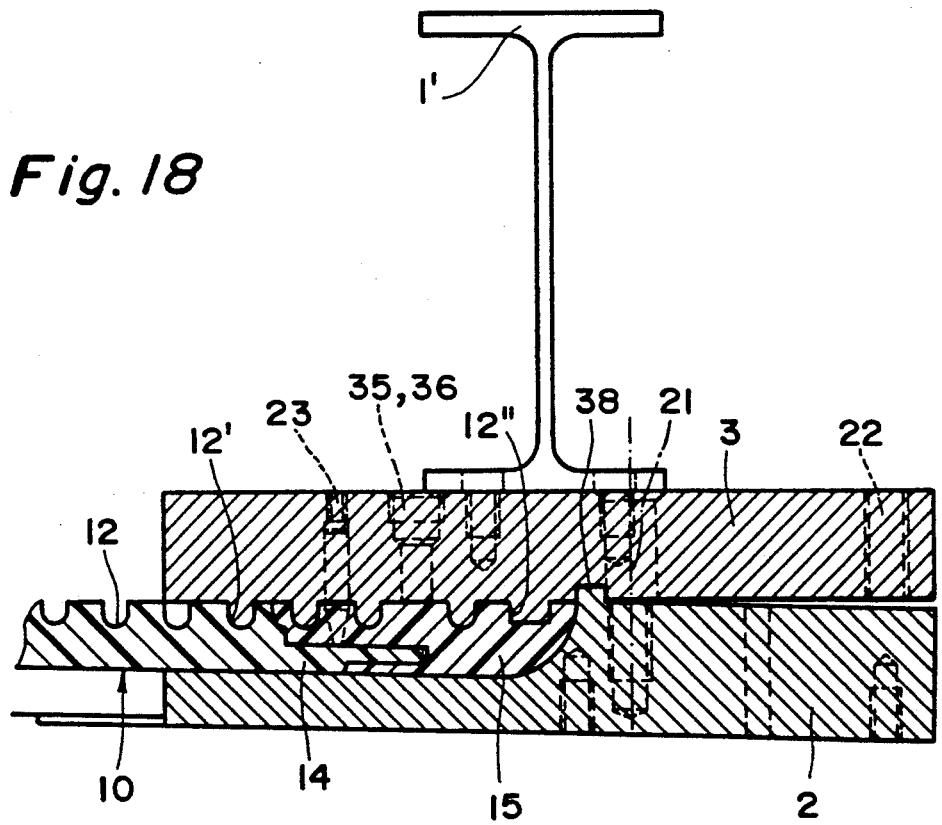
FIG. 18 is a sectional view along line XVIII—XVIII in FIG. 17.

FIG. 17 shows a detail of the molding apparatus according to the invention for coating or casting profiled edges onto existing endlessly manufactured belts. One side of conveyor belt 10 is enclosed between lower mold 2 and upper mold 3. Molds 2 and 3 are tiltable towards one another by means of screw biased tilt connection 21 and adjustable by means of straining screws 22. Upper mold 3 is supported by supporting bracket 1' as shown in FIG. 18. Precision belt 10 provided with profile 12 is fixed to lower mold 2 by clamping screws 23. The plastic material is introduced by inlet orifice 35 while ventilation orifice 36 provides the air in the mold a means for escape. A front-side seal 37 (FIG. 17) and a seal at tongue 38 of lower mold 2 between upper mold 3 and lower mold 2 (FIG. 18) prevent the entry of outside air and prevent leakage.

Figure 19:
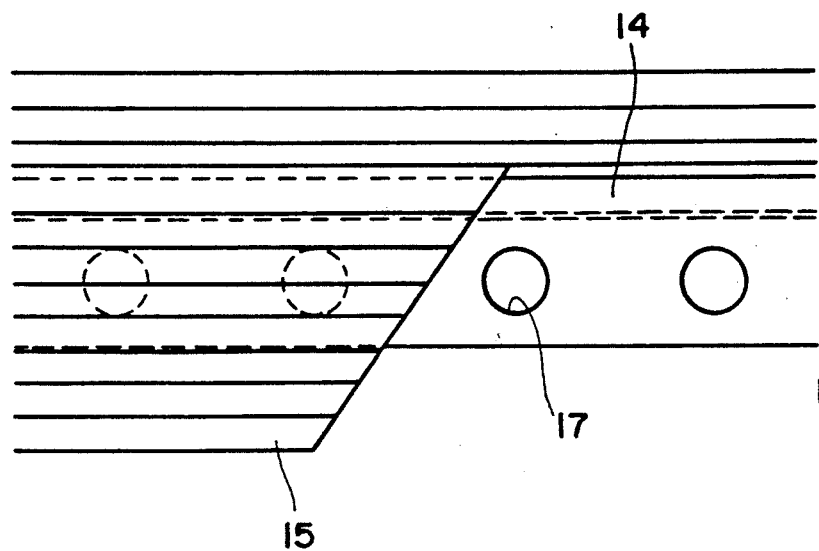
FIG. 19 represents a partial plan view of a transition site of the conveyor belt according to the invention.
Figure 20:
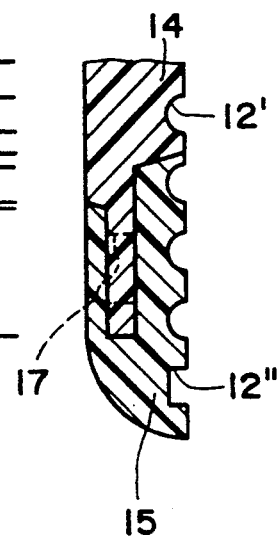
FIG. 20 the associated cross-sectional view of FIG. 19 through the belt edge.

FIGS. 19 and 20 show the reinforcement of a transition site in belt 10 according to the invention. As shown, basic belt 14 has a marginal area with perforations 17 for the positive connection with the plastics material casting or profiled edge 15.

Figure 21:
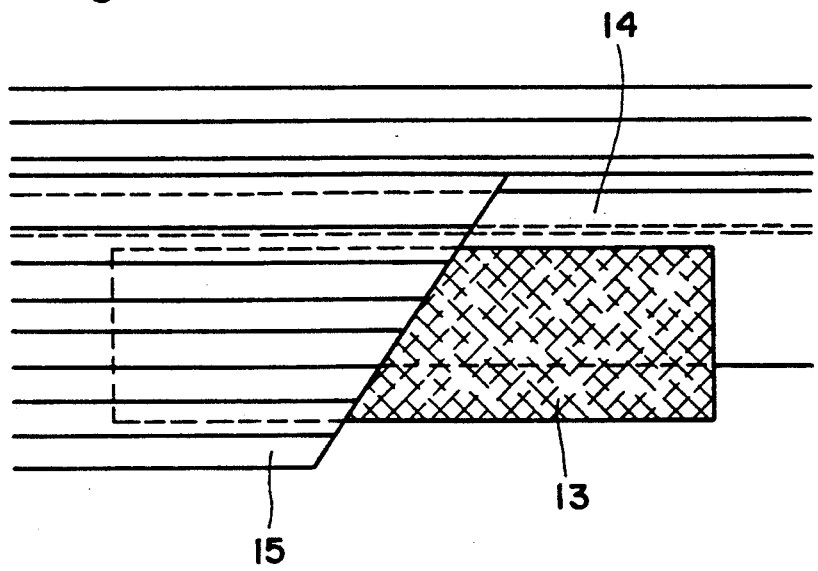
FIG. 21 represents a partial plan view of a variant of a transition site similar to FIG. 19 of the conveyor belt according to the invention.
Figure 22:
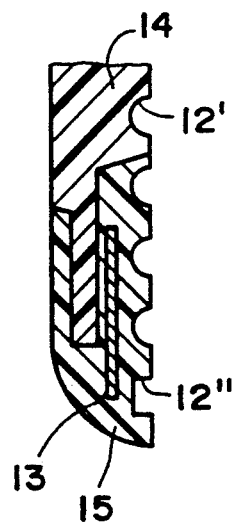
FIG. 22 is the associated cross-sectional view of FIG. 21 through the belt edge.

FIGS. 21 and 22 show a fabric insert 13 for connecting the plastics material castings 15 and reinforcing the transition site between basic belt 14 and edge 15.

Figure 23:
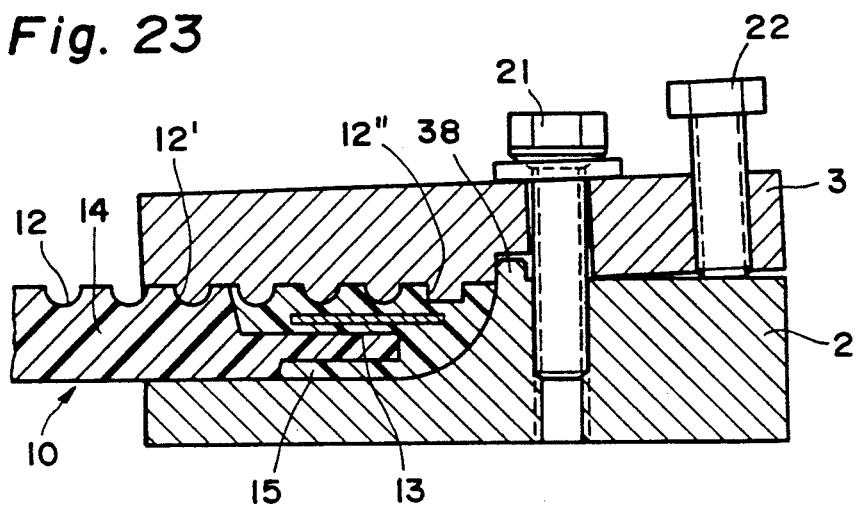
FIG. 23 again shows a partial cross-section through the edge of a conveyor belt according to the invention and the casting mold similar to FIG. 18.

FIG. 23 shows the edge of the belt 10 with applied and tilted casting mold 2 and 3 similar to FIG. 18, but with the positive connection of the plastics material castings 15 reinforced by fabric insert 13 similar to FIGS. 21 and 22.

Figure 24:
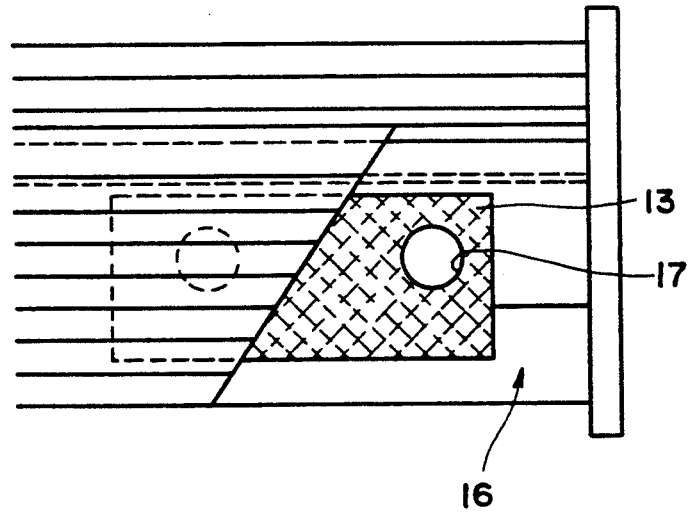
FIG. 24 is a partial plan view of a further variant of the transition site of the conveyor belt according to the invention similar to FIG. 19.
Figure 25:
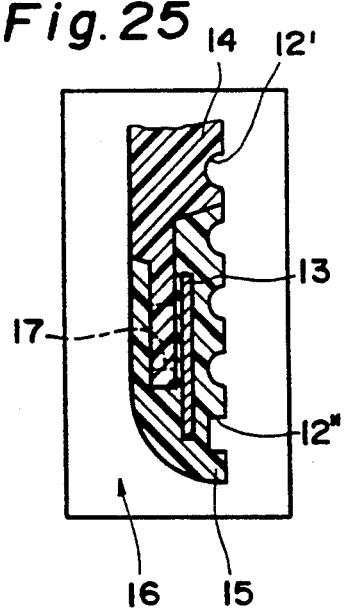
FIG. 25 represents the associated cross-section of FIG. 24 through the belt edge.

FIGS. 24 and 25 show the reinforcement of a transition site and the connection of castings 15 by fabric insert 13 and perforations 17. A sealing element 16 of polyurethane serves for sealing the endless belt against upper and lower molds 2 and 3 to obtain a casting suitable for vacuum and free of bubbles.

Figure 26:
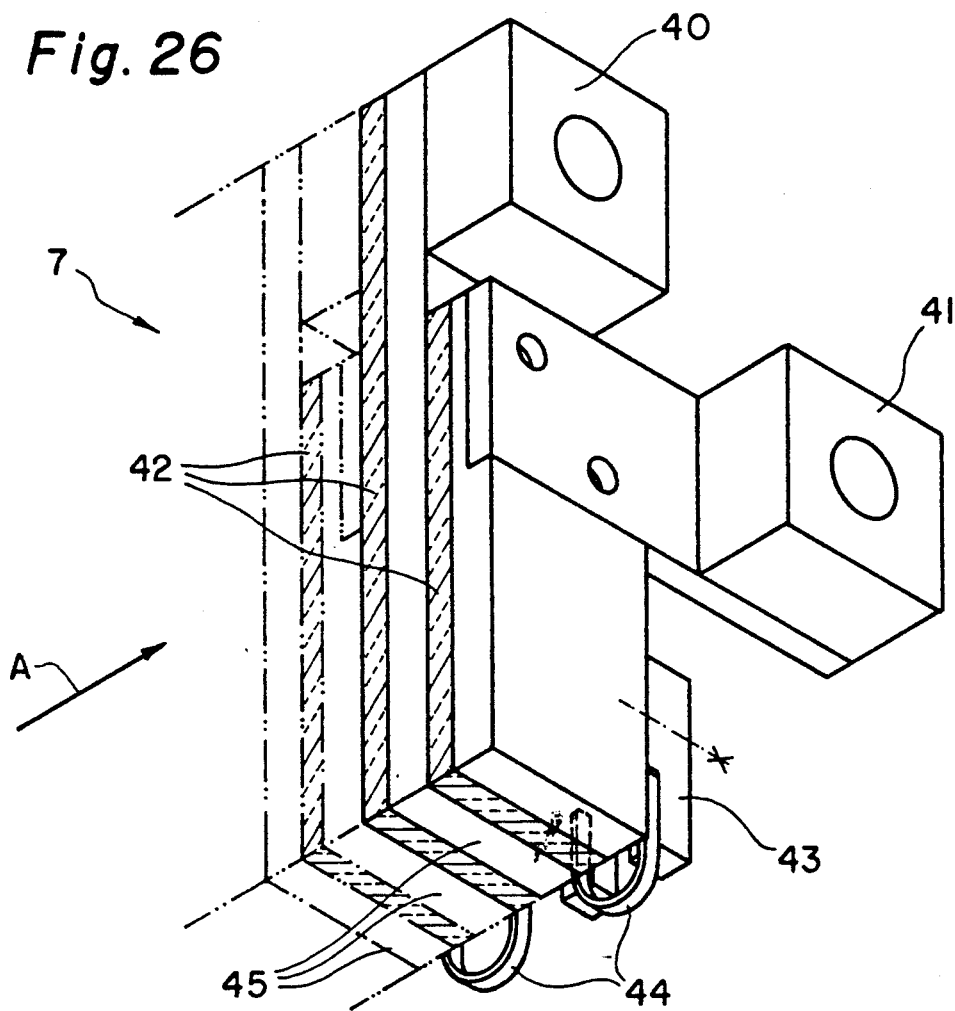
FIG. 26 shows the multiple cutting device and the cutting head for profiled conveyor belts in perspective view.

FIG. 26 shows multiple cutting means or multiple profile-producing means 7 according to FIG. 13, having a cutting head. The electrically conductive electrode connection 40, preferably consisting of copper, is separated from the also electrically conductive earth connection 41 by insulating plates 42. Cutting knives 44 are urged against plates 45 which are conductively connected to connections 40 and 41 by means of clamping element 43 and are thus subjected to current flow.

Figure 27:
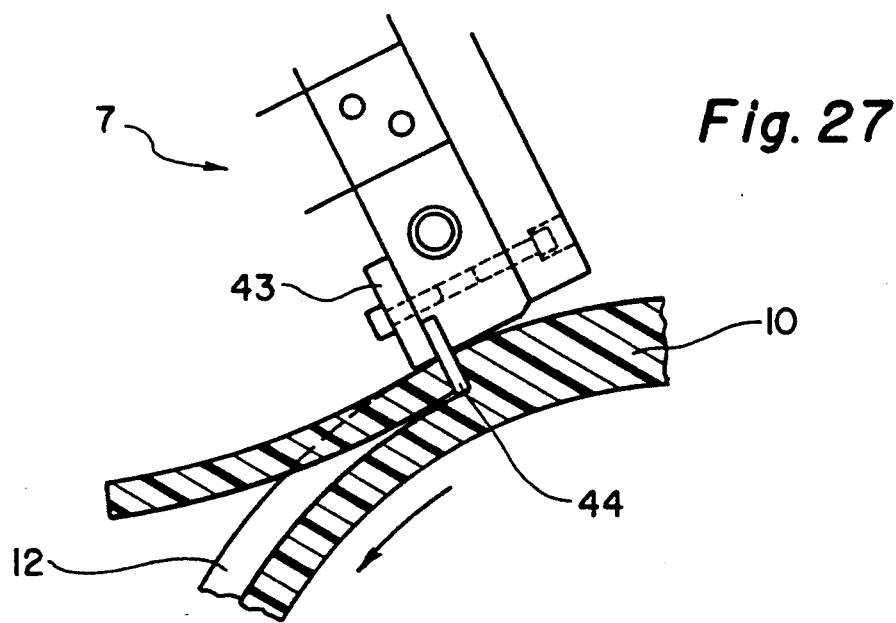
FIG. 27 is a view according to arrow A in FIG. 26.

FIG. 27 shows a view in the direction of arrow A in FIG. 26 of electrically heated cutting knife 44 as it cuts profile 12 out of circulating conveyor belt 10. The electric current flowing through cutting knife 44 is controlled as a function of the cutting resistance, i.e. the axial spring force due to the cutting force.

In production, belt 10 is first placed into the apparatus according to FIG. 13. Regulating rolls 6 are then adjusted in both rotating directions. The belt deviation tolerance per belt cycle is predetermined as 0.1 mm in rotating direction to the cutting head of multiple profile means 7 and as 5 mm in direction to drive 4. Then the operational hour counter status is determined, the belt course limit switch is set and a 60 hour stretch run at a belt bias of 25-30 Kp/cm corresponding to a sag of 15-13 cm is carried out. The belt is then manually cut by means of cutting head 7 (one cutting edge) to a certain width and an orientation groove 12' and tear-off groove are produced. A manual cut is then made up to the fabric underside by means of the cutter carriage knife 44, and the rubber end strips are torn off down to the fabric in one operation. Finally before casting, hot air heater 8 is mounted and the molds are heated to 70° C. Belt 10 is formed free of stresses by continuously running the belt at low tension and high temperatures.

The polyurethane edge casting is carried out as follows:

1. Upper mold 3 is lowered by means of a hanger exactly into the cut orientation groove 12' of the rubber belt and tongue 38 of the lower mold 2.

2. Supporting bracket 1' is removed and the row of screws of tilt connection 21 are manually slightly tightened several times (three runs) starting from one side.

3. The row of straining screws 22 are manually tightened in at least three runs starting from one side until upper mold 3 tilts and tightly abuts the rubber of belt 10.

4. The row of clamping screws 23, sealed by means of teflon tape, is slightly tightened manually until the bolt fixes the rubber of belt 10 on to lower mold 2.

5. Mold 2 and 3 with belt 10 is placed in an inclined position upon reaching a mold temperature of 70° C., a minimum vacuum of 80 percent is applied and the mold is ready for casting.

6. After casting and tempering for 20 hours at 70° C., hot air heater 8 is removed and belt 10 is advanced by one third of the circumferential length; the operation is then repeated from step 1. on until the entire belt edge is finished.

This process is followed by cutting the remaining grooves by means of multiple profiles means or the cutter head 7. Belt 10 may be advanced to profiling means 7 by profile roll 9 engaged with optional profile groove 12". The belt is finally cleaned and dismantled as a finished profiled precision belt 10.

The precision of belt guidance is thus not only of essential influence in the operation of a conveyor belt or filter belt, but also during the production and finishing operations of the belts (during the coating process of the edges).

Profile rolls 9 or guiding rolls or multiple-profile rolls are arranged on the outer zone of the band or belt 10 so that the elastic deformation of the inner zone of the band or belt does not exert any influence on the precision of the outer contours. When using conventional belt regulators, the tolerance range of the guidance can only be as precise as the precision of the guiding groove or the edge limitation of the belt serving for lateral guidance. Therefore, to obtain a belt regulation for high-precision belt course, a precise edge or sensing groove must be provided on the belt.

Although belt 10 has been described as being elastomeric, edges according to the present invention may be formed on any conventional belt material such as fabric mesh. Similarly, any conventional molding or coating material may be used for forming the edges.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification, but rather, only by the scope of the claims appended hereto.

What is claimed is:

1. An apparatus for producing a continuous conveyor belt having at least one profiled edge for mating with a complementary profiled edge of a second continuous conveyor belt, said apparatus comprising:
   transporting means for progressing and supporting a continuous conveyor belt;
   cutting means for cutting a longitudinal orientation groove in an outer face of said conveyor belt as the belt is progressed;
   molding means for molding a profiled edge onto a marginal edge of said belt, said molding means being located adjacent said transporting means; and
   guide means cooperating with said orientation groove for laterally guiding the belt into said molding means.

2. The apparatus according to claim 1, wherein
said transporting means comprises a pair of rotatable rollers supporting the belt.

3. The apparatus according to claim 2, and further comprising
tensioning means for linearly displacing said rollers with respect to each other.

4. The apparatus according to claim 1, said molding means comprising an upper mold and a lower mold, said upper mold being tiltable with respect to said lower mold to clamp said conveyor belt.

5. The apparatus according to claim 1, further comprising
means for heating said molding means.

6. The apparatus according to claim 1, wherein
said molding means includes an inlet orifice for receiving plastic material and a ventilation orifice for allowing air to escape from said mold.

7. The apparatus according to claim 1, wherein
said cutting means comprises a multiple contour knife.

8. The apparatus according to claim 1, further comprising
heating means for heating said cutting means.

9. The apparatus according to claim 8, comprising
control means responsive to a speed of said belt for controlling temperature of said heating means.

10. An apparatus for producing a continuous conveyor belt having at least one outwardly facing continuous, profiled edge for mating with a complementary profiled edge of a second continuous conveyor belt in an interlocking relationship, said apparatus comprising:
    transporting means for advancing a continuous conveyor belt having a marginal edge in a plurality of sequential steps;
    cutting means for cutting a longitudinal orientation groove in an outer face of said conveyor belt while advancing said conveyor belt;
    molding means for molding a profiled edge of plastic material on upper and lower surfaces of said marginal edge of said conveyor belt;
    guide means coupled to said molding means and operatively connected to said orientation groove of said conveyor belt for aligning said belt in said molding means.

11. The apparatus according top claim 10, said molding means including means for molding an edge portion defining at least one longitudinal depression.

12. The apparatus according to claim 10, said molding means including means for molding an edge portion defining at least one longitudinal elevation.

13. The apparatus according to claim 10, comprising tensioning means for tensioning said conveyor belt within said mold such that said belt is substantially free of stress.

14. The apparatus according to claim 10, comprising heating means for heating said conveyor belt while in said mold.

15. The apparatus according to claim 10, comprising means for forming perforations in said marginal edge of said conveyor belt before molding said edge portion.

16. The apparatus according to claim 10, comprising means for applying a reinforcing fabric on said marginal edge of said belt prior to molding said edge portion.

17. The apparatus according to claim 10, comprising means for cutting and removing a portion of upper and lower surfaces of said marginal edge of said belt before introducing said belt into said mold.

18. The apparatus according to claim 10, wherein said molding means further comprises at least one rib on an internal mold surface for mating with said orientation groove in said conveyor belt for aligning said belt in said molding means.

19. The apparatus according to claim 10, said molding means further comprising an upper and a lower mold and clamping means for clamping said upper and lower molds against said marginal edge of the belt.

20. The apparatus according to claim 10, wherein said belt including a reinforcing fabric and said apparatus comprising
cutting means for cutting and removing a portion of an upper and lower face of said marginal edge of said belt to expose said reinforcing fabric before introducing said belt into said molding means.

21. The apparatus according to claim 10, comprising cutting means for cutting at least one second longitudinal groove in said belt extending substantially parallel to said profiled edge in said edge portion.

22. The apparatus according to claim 10, further comprising
cushioning means for supporting said conveyor belt while advancing said belt.

23. The apparatus according to claim 22, wherein said cushioning means comprises an air cushion.

24. The apparatus according to claim 10, said transporting means comprising a pair of spaced rollers, said conveyor belt extending between said rollers, said tensioning means for adjusting the distance between each of said rollers.

25. The apparatus according to claim 10, said cutting means comprising a heated contour knife.

26. The apparatus according to claim 10, comprising means for heating air and introducing heated air onto said molding means.

27. An apparatus for producing a continuous conveyor belt having at least one outwardly facing continuous profiled edge for mating with a complementary profiled edge of a second continuous conveyor belt in an interlocking relationship, said apparatus comprising:
advancing means for supporting and advancing a continuous conveyor belt having a marginal edge;
control means for controlling said advancing means to advance said conveyor belt in a plurality of stages;
cutting means for cutting at least one first longitudinal orientation groove on an outer surface of said marginal edge of said conveyor belt;
guide means operatively connected to said orientation groove for guiding said conveyor belt;
molding means for molding a profiled edge of plastic material on an upper and lower marginal edge of a first portion of said conveyor belt, said control means including means for closing said mold on said marginal edge and charging said molding means with said plastic material, said molding means including at least one longitudinal rib on an inner face of said molding means for mating with said orientation groove to align said marginal edge in said molding means.

28. The apparatus according to claim 27, said control means further comprising means for opening said molding means, means for advancing said conveyor belt through said molding means and means for charging said molding means for molding a second profiled edge on a second portion of said conveyor belt.

29. The apparatus according to claim 27, said molding means comprising an upper section having a molding face for molding said profiled edge, and a lower section coupled to said upper section for clamping a marginal edge of said conveyor belt.

30. The apparatus according to claim 29, comprising means for pivoting said upper section with respect to said lower section.

* * * * *